US011480111B2

(12) United States Patent
Jan et al.

(10) Patent No.: US 11,480,111 B2
(45) Date of Patent: Oct. 25, 2022

(54) VARIABLE AREA TURBINE NOZZLE AND METHOD

(71) Applicant: HONEYWELL INTERNATIONAL INC., Morris Plains, NJ (US)

(72) Inventors: David K. Jan, Fountain Hills, AZ (US); Dietmar Giebert, Phoenix, AZ (US); Thomas G. Cunningham, Jr., Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 93 days.

(21) Appl. No.: 16/412,771

(22) Filed: May 15, 2019

(65) Prior Publication Data
US 2020/0362768 A1 Nov. 19, 2020

(51) Int. Cl.
*F01D 17/08* (2006.01)
*F02C 9/22* (2006.01)
(Continued)

(52) U.S. Cl.
CPC .............. *F02C 9/22* (2013.01); *F01D 17/08* (2013.01); *F01D 17/14* (2013.01); *F01D 17/16* (2013.01);
(Continued)

(58) Field of Classification Search
CPC .......... F01D 17/08; F01D 17/14; F01D 17/16; F01D 17/04; F01D 17/141; F01D 17/162;
(Continued)

(56) References Cited

U.S. PATENT DOCUMENTS 2,411,895 A  12/1946 Poole
2,514,393 A * 7/1950 Hutchinson ............... F02K 1/08
                                                     60/242

(Continued)

FOREIGN PATENT DOCUMENTS

DE        10202532 C1    5/2003
GB         2301868 A  * 12/1996  .......... F01D 17/162
WO       2015/048238 A1    4/2015

OTHER PUBLICATIONS

Carriere, D.L., "Variable Power Turbine Nozzle System Mechanical Development," The American Society of Mechanical Engineers, Mar. 31, 1977, Downloaded From: https://proceedings.asmedigitalcollection.asme.org on Dec. 11, 2018.

(Continued)

Primary Examiner — David E Sosnowski
Assistant Examiner — Wayne A Lambert
(74) *Attorney, Agent, or Firm* — Lorenz & Kopf, LLP

(57) ABSTRACT

A gas turbine engine with a compressor supplying compressed air. A combustor receives the compressed air and fuel and generates a flow of combusted gas. A turbine receives a core flow of the combusted gas to rotate a turbine rotor. A turbine inlet nozzle directs the combusted gas to the turbine rotor. Vanes are disposed in the turbine inlet nozzle and rotate to vary a flow area through which the core flow passes. The vanes adjust a pressure ratio of the gas turbine engine to compensate for changing operational requirements of the gas turbine engine by rotating to positions matching the changing operational requirements.

20 Claims, 8 Drawing Sheets

(51) Int. Cl.
*F01D 17/16* (2006.01)
*F01D 17/14* (2006.01)
*F02C 9/54* (2006.01)
*F01D 17/06* (2006.01)
*F01D 17/04* (2006.01)
*F01D 19/02* (2006.01)

(52) U.S. Cl.
CPC ............... *F02C 9/54* (2013.01); *F01D 17/04* (2013.01); *F01D 17/06* (2013.01); *F01D 19/02* (2013.01); *F05D 2220/323* (2013.01); *F05D 2220/50* (2013.01); *F05D 2270/10* (2013.01); *F05D 2270/11* (2013.01); *F05D 2270/20* (2013.01)

(58) Field of Classification Search
CPC .......... F01D 19/02; F01D 17/06; F01D 17/02; F02C 9/22; F02C 9/54; F05D 2220/323; F05D 2220/50; F05D 2270/10; F05D 2270/11; F05D 2270/20
See application file for complete search history.

(56) References Cited

U.S. PATENT DOCUMENTS

| | | | |
|---|---|---|---|
| 2,551,229 A | 5/1951 | Alford et al. | |
| 2,608,054 A | 8/1952 | Price | |
| 2,791,882 A | 5/1957 | Willard | |
| 3,060,686 A | 10/1962 | Le May et al. | |
| 3,385,509 A * | 5/1968 | Garnier | F01D 5/03 415/66 |
| 3,777,479 A * | 12/1973 | Hagen | F02C 9/54 60/39.25 |
| 3,834,161 A * | 9/1974 | Quigley, Jr. | F02C 7/32 60/244 |
| 4,221,114 A * | 9/1980 | Wilde | F02K 3/06 60/242 |
| 4,759,178 A * | 7/1988 | Joy | F02C 7/272 60/787 |
| 4,912,921 A * | 4/1990 | Rice | F02C 7/32 244/58 |
| 4,932,206 A | 6/1990 | Sawyer et al. | |
| 5,079,916 A * | 1/1992 | Johnson | F02K 3/072 416/129 |
| 6,701,717 B2 * | 3/2004 | Flatman | F01D 9/041 60/792 |
| 7,036,321 B2 | 5/2006 | Dudebout et al. | |
| 7,251,942 B2 | 8/2007 | Dittmar et al. | |
| 7,937,945 B2 * | 5/2011 | Kinde, Sr. | F02K 5/026 60/767 |
| 8,007,229 B2 * | 8/2011 | McCaffrey | F01D 9/041 415/161 |
| 8,079,217 B2 | 12/2011 | Li et al. | |
| 8,291,690 B1 * | 10/2012 | Wehmeier | F02C 9/20 60/226.3 |
| 8,694,170 B2 * | 4/2014 | Sonoda | F02C 9/38 700/287 |
| 8,727,696 B2 | 5/2014 | Cox | |
| 8,862,362 B2 | 10/2014 | Telcholz et al. | |
| 9,863,367 B2 | 1/2018 | Burghdoff et al. | |
| 10,006,374 B2 * | 6/2018 | Gardner | F01D 17/162 |
| 10,012,102 B2 * | 7/2018 | Teixeira | F16H 19/001 |
| 10,087,885 B2 | 10/2018 | Kohlenberg et al. | |
| 10,981,660 B2 * | 4/2021 | Mackin | F02C 7/057 |
| 2006/0016196 A1 | 1/2006 | Epstein | |
| 2010/0260591 A1 * | 10/2010 | Martin | F04D 29/563 415/1 |
| 2011/0176913 A1 * | 7/2011 | Wassynger | F02C 6/12 415/159 |
| 2013/0223974 A1 * | 8/2013 | Schwarz | F02C 9/22 415/1 |
| 2014/0147278 A1 | 5/2014 | Demolis et al. | |
| 2015/0176530 A1 | 6/2015 | Schwarz et al. | |
| 2016/0010652 A1 | 1/2016 | Lim et al. | |
| 2017/0036768 A1 | 2/2017 | Stieger et al. | |
| 2017/0276018 A1 * | 9/2017 | Bifulco | F01D 17/162 |
| 2018/0178920 A1 * | 6/2018 | Swann | F02C 9/54 |
| 2018/0266329 A1 | 9/2018 | Mackin | |

OTHER PUBLICATIONS

Feneley, Adam J. Renewable and Sustainable Energy Reviews (2016), http://dx.doi.org/10/1016/j.rser.2016.12.125.

* cited by examiner

VARIABLE AREA TURBINE NOZZLE AND METHOD

TECHNICAL FIELD

The present invention generally relates to turbine systems and methods, and more particularly relates to a variable area turbine nozzle for improved high-altitude performance, starting capability, and extended time-on-wing.

BACKGROUND

Turbines are used in a wide range of applications as power sources. A gas turbine engine may be used to power various types of vehicles and systems. In aircraft applications, turbines are typically used to provide propulsion for powering flight and also as an auxiliary power unit (APU). Gas turbine engines typically include a compressor that receives and compresses incoming gas such as air that is received through an inlet; a combustor in which the compressed gas is mixed with fuel and burned to produce high-pressure, high-temperature gas; and one or more turbines that extract energy from the gas exiting the combustor, which is exhausted after powering the turbines.

A propulsion engine propels a vehicle such as an aircraft by producing thrust via exiting exhaust gases and/or powers a propeller or fan by a shaft connected with the turbine. The shaft may be used in other applications to provide a variety of functions including driving a helicopter rotor or powering rotating equipment such as a generator. For example, an APU generates compressed air and electric power for supply to various systems, such as those of an aircraft, for purposes such as environmental cooling, lighting, powering electronic systems, and main engine starting. Typically, APUs are located in the aft section of the aircraft such as the tail cone. An APU powered by a gas turbine, includes a compressor stage for supplying pressurized combustion air and a turbine stage that is driven by gases from a combustor.

Demands on turbine engines in various application may vary significantly. For example, in hybrid propulsion applications where a combination of electrical battery power and turboshaft engine power is used, the amount of power delivered by the turbine changes depending on the amount of battery power used. Also for example, during operation, the amount of power required in applications such as an APU changes significantly. Rapid changes in demand may result in surge. In a surge condition, the air exiting the compressor reverses direction, surging back into the compressor. Accordingly, control mechanisms are employed to manage the fluctuations. Prior systems control surge by e.g., providing mid-compressor bleed during rapid acceleration to minimize aerodynamic mis-match within the compressor and compressor back pressure rise due to rapid fuel addition in the combustor. This bleed system requires complex manifolds, large piping and large bleed valve(s) resulting in large weight penalties.

Accordingly, it is desirable to provide power turbine systems capable of extreme operating range and methods for operating the system to achieve required operational capabilities. It is also desirable to provide an effective system in a cost-effective manner with maximized time between maintenance requirements. Furthermore, other desirable features and characteristics of the present invention will become apparent from the subsequent detailed description of the invention and the appended claims, taken in conjunction with the accompanying drawings and this background of the invention.

BRIEF SUMMARY

This summary is provided to describe select concepts in a simplified form that are further described in the Detailed Description section hereof. This summary is not intended to identify key or essential features of the claimed subject matter, nor is it intended to be used as an aid in determining the scope of the claimed subject matter.

In a number of embodiments, a gas turbine engine includes a compressor supplying compressed air. A combustor receives the compressed air and fuel and generates a flow of combusted gas. A turbine receives a core flow of the combusted gas to rotate a turbine rotor. A turbine inlet nozzle directs the combusted gas to the turbine rotor. Vanes are disposed in the turbine inlet nozzle and rotate to vary a flow area through which the core flow passes. The vanes adjust a pressure ratio of the gas turbine engine to compensate for changing operational requirements of the gas turbine engine by rotating to positions matching the changing operational requirements.

In other embodiments, a method is provided for operating a gas turbine engine that includes a compressor, a combustor and a turbine supplied with combustion gas from the combustor through a turbine inlet nozzle. The method includes positioning a number of vanes in the turbine inlet nozzle. The vanes are rotated to vary a flow area through which the core flow passes. A pressure ratio of the gas turbine engine is adjusted to compensate for changing operational requirements of the gas turbine engine by rotating the vanes to a position matching the changing operational requirements In additional embodiments, a gas turbine engine includes a compressor having an air inlet and a compressed air outlet. The compressor is operable to increase temperature and pressure and to supply compressed air. A combustor is configured to receive at least a portion of the compressed air and a flow of fuel, and to generate a flow of combusted gas at a constant pressure. A turbine is coupled to receive a core flow of the combusted gas from the combustor to rotate a turbine rotor while temperature and pressure decrease. The core flow may be axially directed. A turbine inlet nozzle is disposed between the combustor and the turbine rotor and is configured to direct the combusted gas to the turbine rotor. A number of vanes are disposed in the turbine inlet nozzle. The vanes are configured to rotate to vary a flow area through which the core flow passes to reach the turbine rotor. A stem is connected with each of the vanes. A stem gear is disposed on each stem. A ring gear meshes with each stem gear and extends around the turbine. A drive gear meshes with the ring gear. An actuator is configured to rotate the drive gear. The vanes are configured to adjust a pressure ratio of the gas turbine engine to compensate for changing operational requirements of the gas turbine engine by rotating to a position matching the changing operational requirements.

BRIEF DESCRIPTION OF THE DRAWINGS

The present invention will hereinafter be described in conjunction with the following drawing figures, wherein like numerals denote like elements, and wherein.

DETAILED DESCRIPTION

Figure 1:
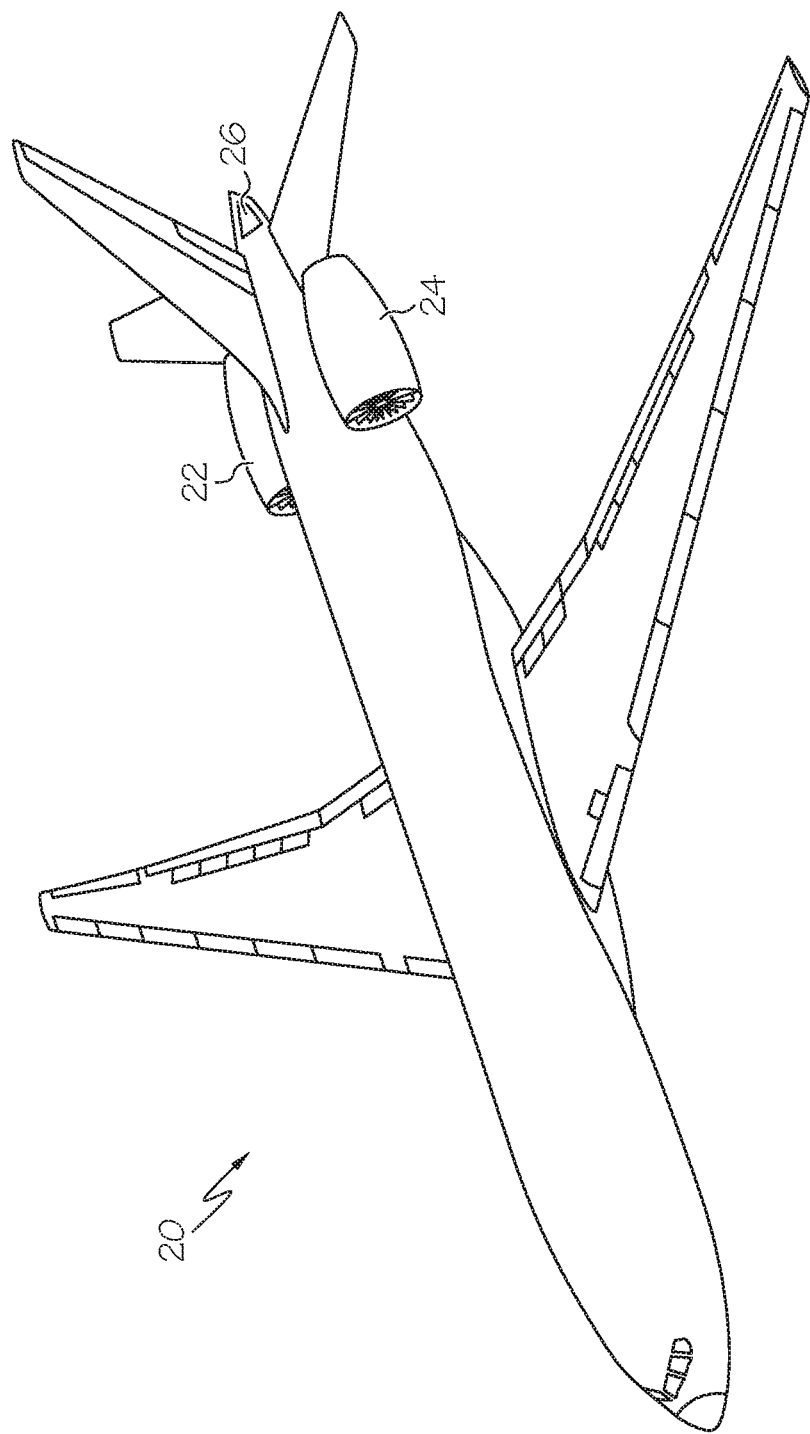
FIG. 1 is a perspective view of an aircraft with turbine propulsion engines and an auxiliary power unit according to an exemplary embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In the following description, an improved turbine nozzle system and methods of operating the turbine system are provided. In the examples given herein, a turbine may be associated with a specific engine, but the disclosure is not limited in application to such engines but rather may be applied to any turbine where improved or extended performance is desired.

In an example of the present disclosure as further described below, a gas turbine engine includes a compressor operable to supply compressed air. The compressor increases temperature and pressure of the air that it compresses. A combustor is configured to receive at least a portion of the compressed air and a flow of fuel, and to generate a flow of combusted gas. The combusted gas has a temperature higher that that leaving the compressor, while the pressure remains essentially constant through the combustor. A turbine is coupled to receive an axially directed core flow (flow may be directed radially in case of a radial turbine), of the combusted gas from the combustor to rotate a turbine rotor. Temperature and pressure of the combusted gas drops through the turbine. A turbine nozzle is disposed upstream from the turbine rotor and is configured to direct the combusted gas to the turbine rotor. A number of vanes are disposed in the turbine nozzle and the vanes are configured to vary a flow area through which the core flow passes. Opening and closing the vanes adjusts the pressure ratio of the engine to compensate for changing flow and turbine inlet requirements of the gas turbine engine. For example, while maintaining constant power output in a single spool gas turbine engine, moving the vanes in a closing direction increases the pressure-ratio of the core flow in the engine, reduces of the core flow, and requires an increase in turbine inlet temperature to maintain the same power output of the engine. Also for example, while maintaining the same power, moving the vanes in an opening direction lowers the pressure-ratio, increases the core flow and allows for a lower turbine inlet temperature of the core flow. The result is one engine that operates like multiple engines of different sizes, which is advantageous by enabling operationally matching of the engine to changing operating conditions.

In an exemplary embodiment as illustrated in FIG. 1, an aircraft 20 includes a pair of turbine engines 22, 24, which are configured as turbofan engines configured to provide propulsion for the aircraft 20. The aircraft 20 also includes a turbine engine 26, which in this embodiment is configured as a part of an APU. Although described in the context of the aircraft 20, various features and characteristics disclosed herein may be used in other contexts and applications where turbines, or turbine engines are used. For example, although the engines 22, 24, 26 are used with the aircraft 20, various other engine environments, as well as different types of turbine machinery will benefit from the features described herein. Thus, no particular feature or characteristic is constrained to an aircraft or to a particular application of a turbine, and the principles are equally embodied in other vehicles or in other equipment and in other applications.

In the current embodiment, the aircraft 20 is powered by the engines 24, which may provide a motive force and/or may provide electrical and hydraulic power generation. Additionally, the engines 22, 24, 26 may supply high pressure and/or high temperature air to various other components and system of the aircraft 20, if desired. As illustrated, the engines 22, 24 are coupled with the aircraft 20 on opposite sides of the fuselage. In other embodiments, other mounting positions may be used. The turbine engines 22, 24 provide propulsion for the aircraft 20. The turbine engine 26 provides energy for an environmental control system of the aircraft 20, electrical power for various purposes, and may provide other functions.

Figure 2:
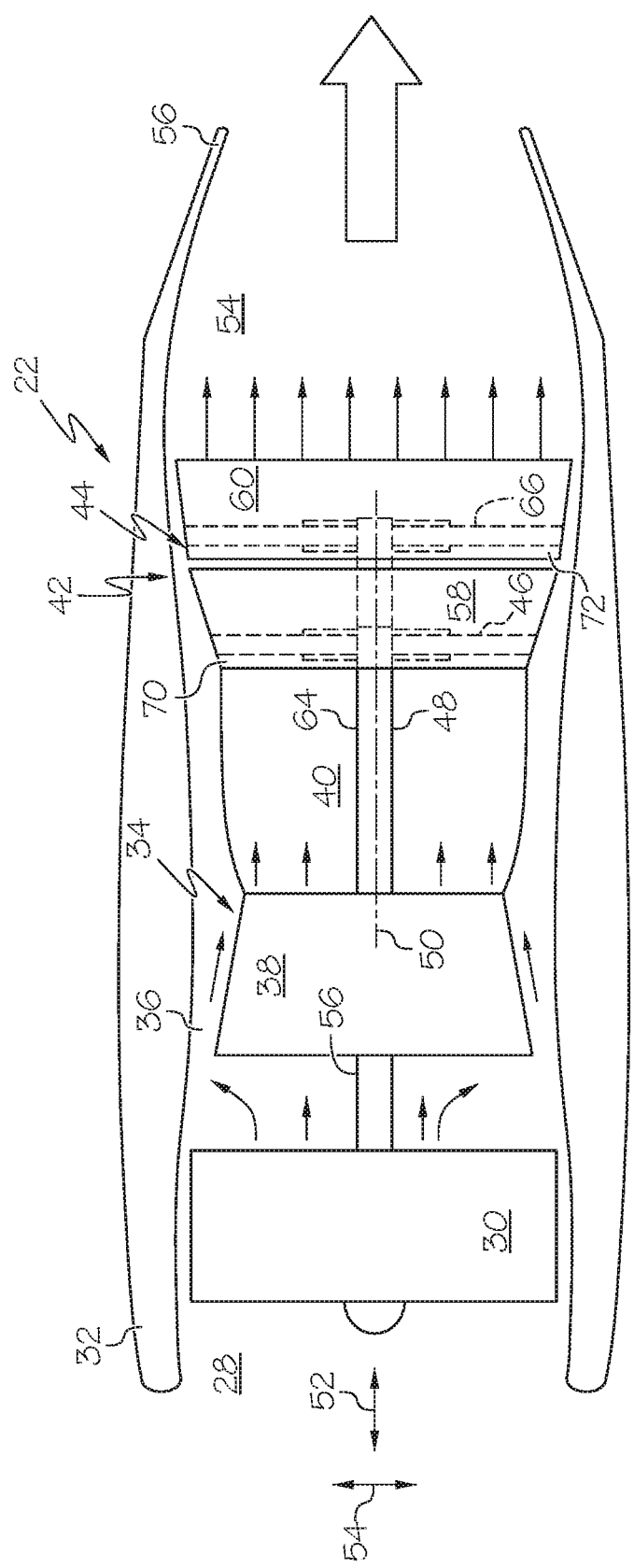
FIG. 2 is a cross-sectional, schematic illustration of a partial propulsion engine assembly of the aircraft of FIG. 1 according to the exemplary embodiment.

As noted above, the turbine system described herein may be employed in a variety of applications, including in the engines 22, 24, 26 or other applications. By way of an exemplary embodiment, the engine 22 will be described with reference to FIG. 2. It should be understood that the engine 24 is similar to the engine 22. As illustrated in FIG. 2, the engine 22 is configured as a gas turbine engine for aircraft propulsion. The engine 22 includes an intake 28, with a fan section 30 disposed in a fan case 32. The fan section 30 draws air into the engine 22, accelerates the air within the engine 22, and may assist in providing propulsion for the aircraft 20. The air is directed through two paths, a core flow into the engine core 34, and a bypass through a bypass duct 36. A compressor section 38 compresses the air delivered to the engine core 34 and sends it to a combustion section 40. In the combustion section 40 the air is mixed with fuel and ignited for combustion. Combustion air is directed into a turbine section 42, which may include single or plural turbine stages. The hot, high-speed air flows within the turbine case 44 and over the turbine rotor blades 46, 66 which spin on shafts 48, 64 about an axis 50. The axis 50 defines an axial direction 52, with a radial direction 54 projecting from the axis 50 and normal thereto. The air from the turbine section 42 rejoins that from the bypass duct 36 and is discharged through an exhaust section 54 including through a propulsion nozzle 56.

The turbine section 42 includes one or more turbine stages. In the depicted embodiment, the turbine section 42 includes two turbine stages, a high-pressure turbine 58, and a power turbine 60. However, it will be appreciated that the engine 22 may be configured with a different number of turbine stages. As the turbines 58, 60 rotate, their rotor blades 46, 66 drive equipment in the engine 22 via a two-spool arrangement with concentrically disposed shafts 48, 64. Specifically, the high-pressure turbine rotor blades 46 drive the compressor 38 via a high-pressure spool including the shaft 48, and the power turbine rotor blades 66 drive the fan 30 via a low-pressure spool including a shaft 64. The high-pressure turbine 58 includes a turbine nozzle 70 upstream from the rotor blades 46 and the power turbine 60 includes a turbine nozzle 72 upstream from the rotor blades 66. The turbine nozzle 70 and/or the turbine nozzle 72 may include a variable device for varying flow area as described below.

Figure 3:
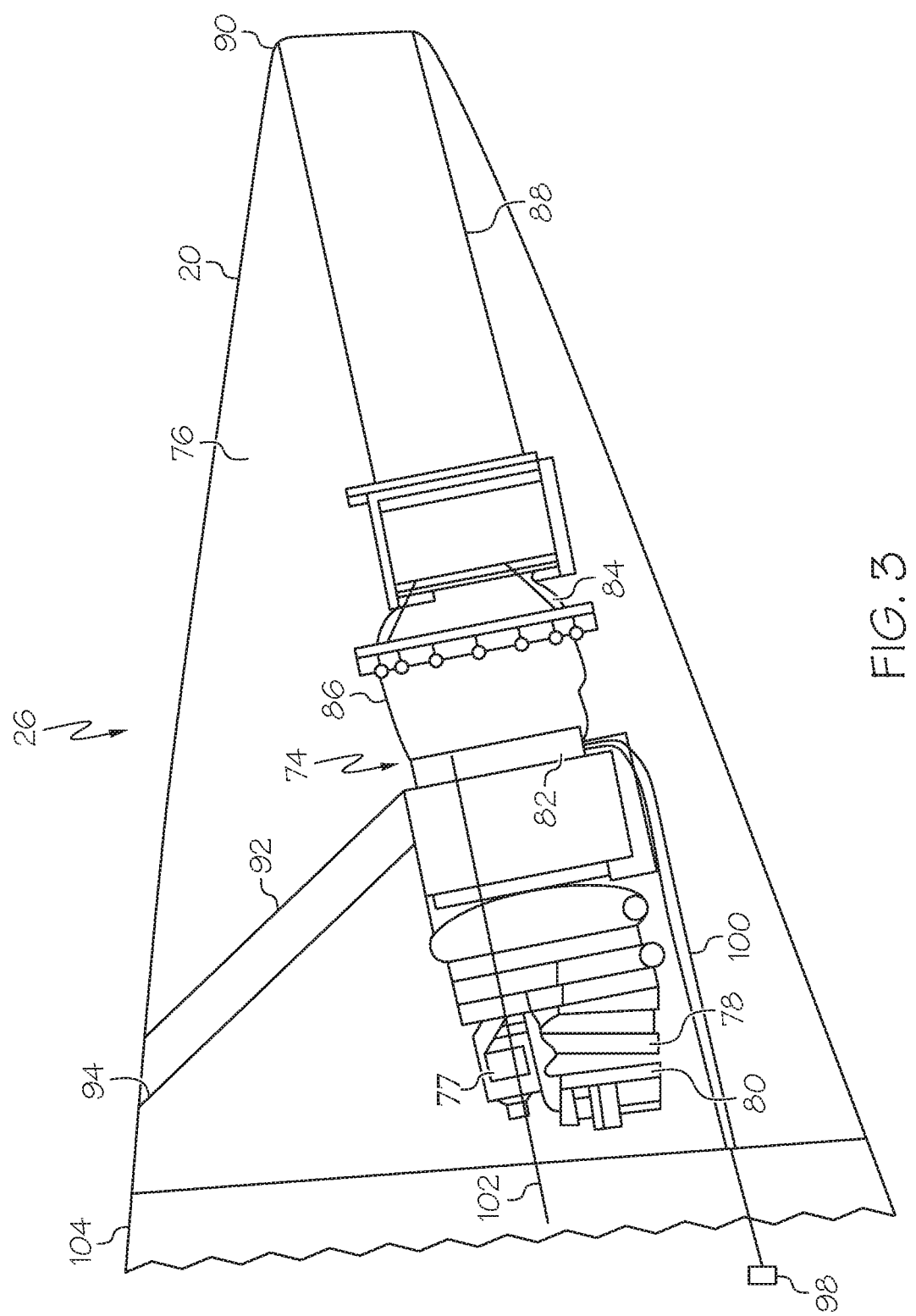
FIG. 3 is a cross-sectional illustration of the tail cone area of the aircraft of FIG. 1 including the auxiliary power unit, according to an exemplary embodiment.
Figure 4:
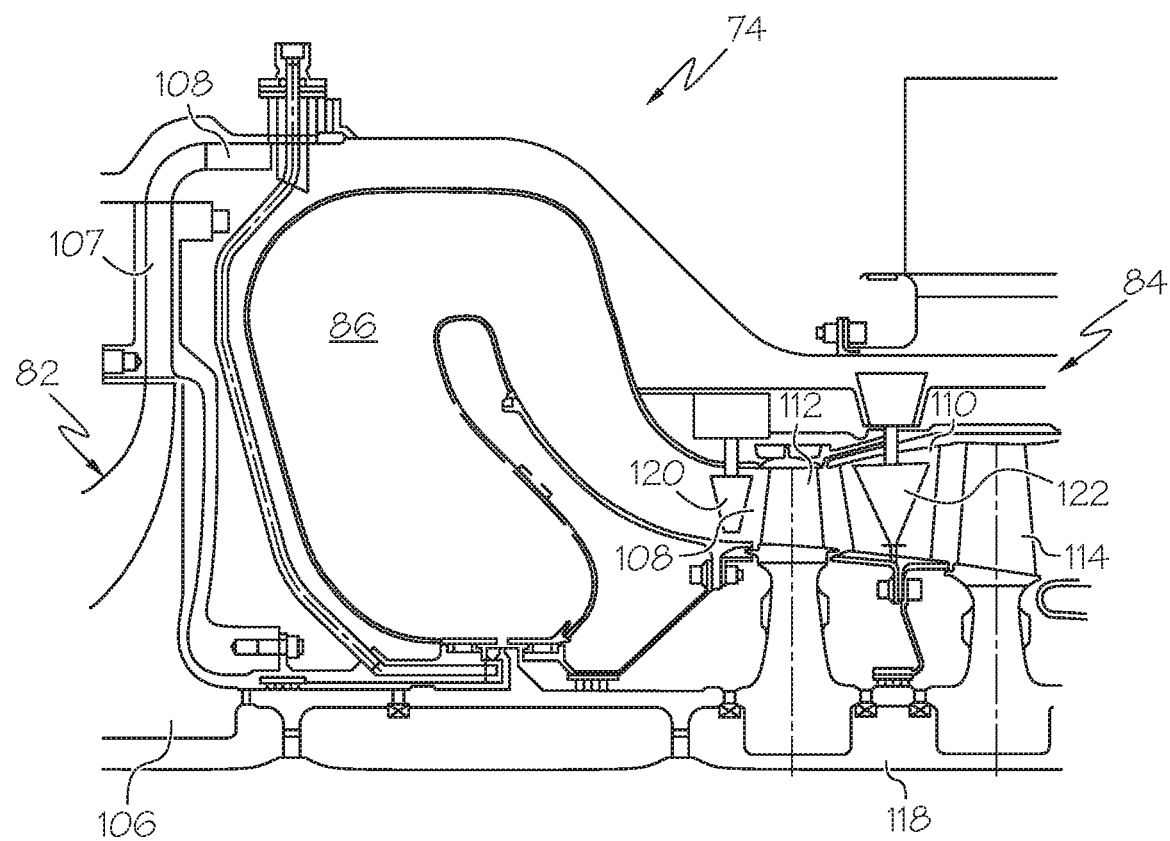
FIG. 4 is cross-sectional illustration of part of the engine of the auxiliary power unit of FIG. 3, according to an exemplary embodiment.

By way of another exemplary embodiment, the engine 26 involves a gas turbine APU 74, as illustrated in FIGS. 3-4. As shown in FIG. 3, the tail cone 76 area of the aircraft 20 defines a compartment that houses the APU 74. The APU 74 generally includes the turbine engine 26 which powers the APU 74. The APU 74 includes a starter 77 for starting the engine 26, a gearbox 78 for driving various loads including a generator 80 for supplying electrical power, a power compressor 82 for supplying air to a turbine section 84 through a combustor 86, and an exhaust duct 88 for delivering exhaust out of the tail 90 of the aircraft 20. The compressor 82 receives outside air from an inlet duct 92 that extends between the APU 74 and an inlet opening 94. In addition to supplying a main flow of combustion air to drive the turbine section 84, the compressor 82 delivers, such as through a bleed system, compressed air for pneumatic powered systems 98 of the aircraft 20 through a supply duct 100. Gas in the form of air is compressed by the compressor 82 and delivered for separate uses including by the combustor 86 and by the systems 98. The compressor 82 may be supplied with return pressurized air through a duct 102 from the aircraft cabin 104 and/or from other uses. The return air supplied back to the engine 26 generally varies in flow rate during operation of the aircraft 20.

In the exemplary embodiment of the APU 74 as illustrated in FIG. 4, a cross section view of a portion of the engine 26 is shown. The compressor 82, includes an impeller 106. The compressor 82 raises the pressure and temperature of air and supplies compressed air via a diffuser 107. In the depicted embodiment, the compressor 82 is a single-stage, high-pressure ratio centrifugal compressor. However, it will be appreciated that this is merely exemplary embodiment, and that other types of compressors may also be used. The compressed air from the compressor 82 is directed into the combustor 86, where it is mixed with fuel supplied from a fuel source (not shown). In the combustor 86 the fuel/air mixture is combusted at constant pressure, generating high-energy combustion gas with an increased temperature. The high-energy gas is supplied to the turbine section 84 through turbine nozzles 108, 110.

The high-energy gas from the combustor 86 expands through the turbine section 84, where it gives up energy in the form of temperature and pressure and causes the turbine rotors 112, 114 to rotate. The gas is then exhausted from the APU 74. As the turbine rotors 112, 114 rotate, they drive, via a turbine shaft 118, various types of equipment that may be mounted in, or coupled to, the engine 26. For example, in the depicted embodiment the shaft 118 drives the compressor impeller 106. It will be appreciated that the turbine may also be used to drive the generator 80 of FIG. 3 and/or other rotational equipment. In the current example, the turbine nozzle 108 includes a VATN assembly 120 and the turbine nozzle 110 includes a VATN assembly 122 providing variable area turbine nozzles for varying its flow area as further described below.

Referring to FIGS. 5-8 the described embodiments generally address flow and pressure ratio mis-match, control exhaust gas temperature rise, provide for high-altitude APU starting, and provide other benefits. In the current embodiments, these and other objectives are accomplished through the inclusion of a number of features including a variable area turbine nozzle (VATN) system for the turbine nozzles 70, 72, 108 and/or 110 including in high performance axial flow applications. The VATN system may be applied to any or to multiple stages of the engines 22, 24, 26 or other applications.

Figure 5:
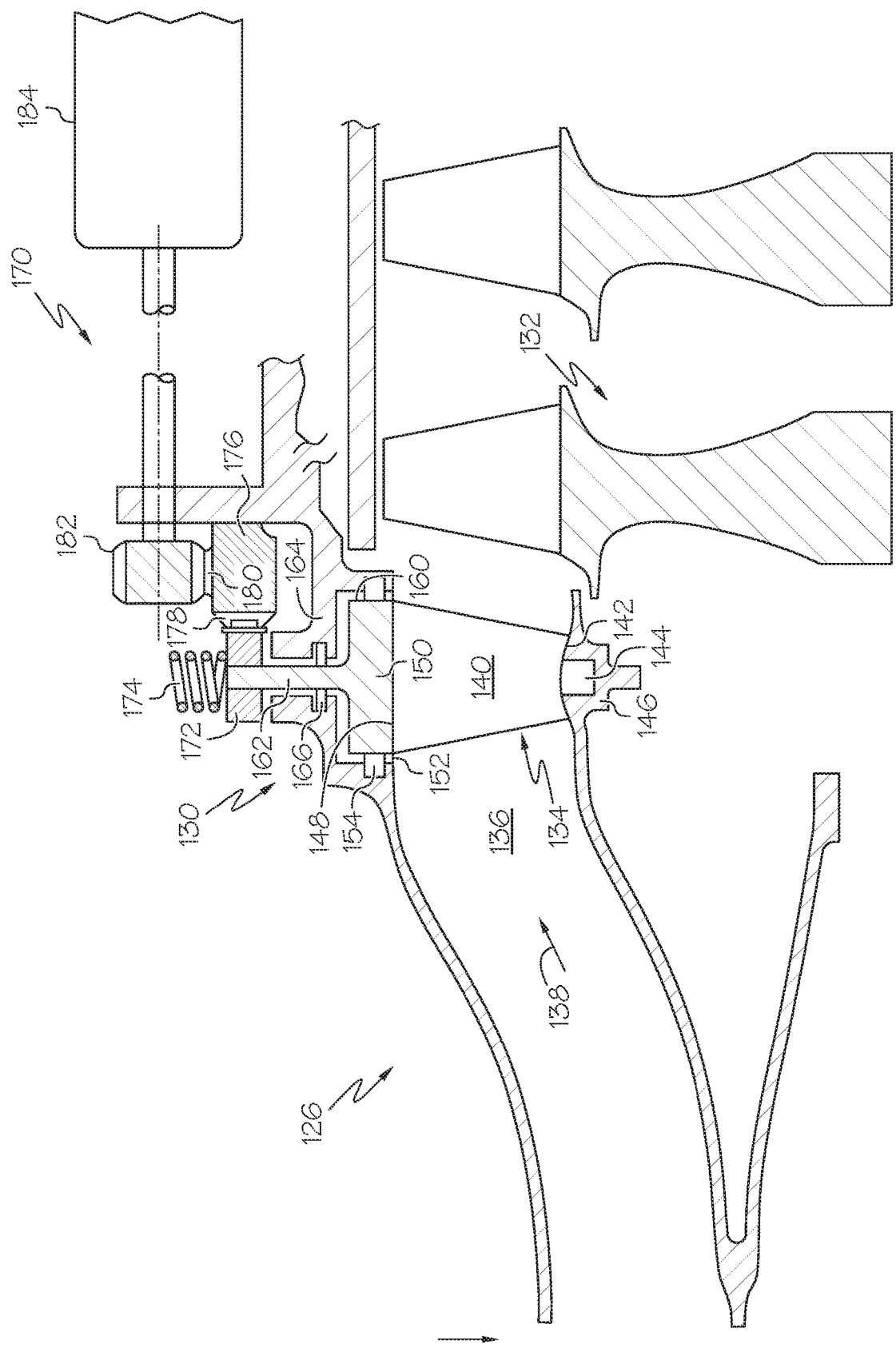
FIG. 5 is a schematic, longitudinal cross-sectional illustration of the turbine area of an engine, according to an exemplary embodiment.
Figure 6:
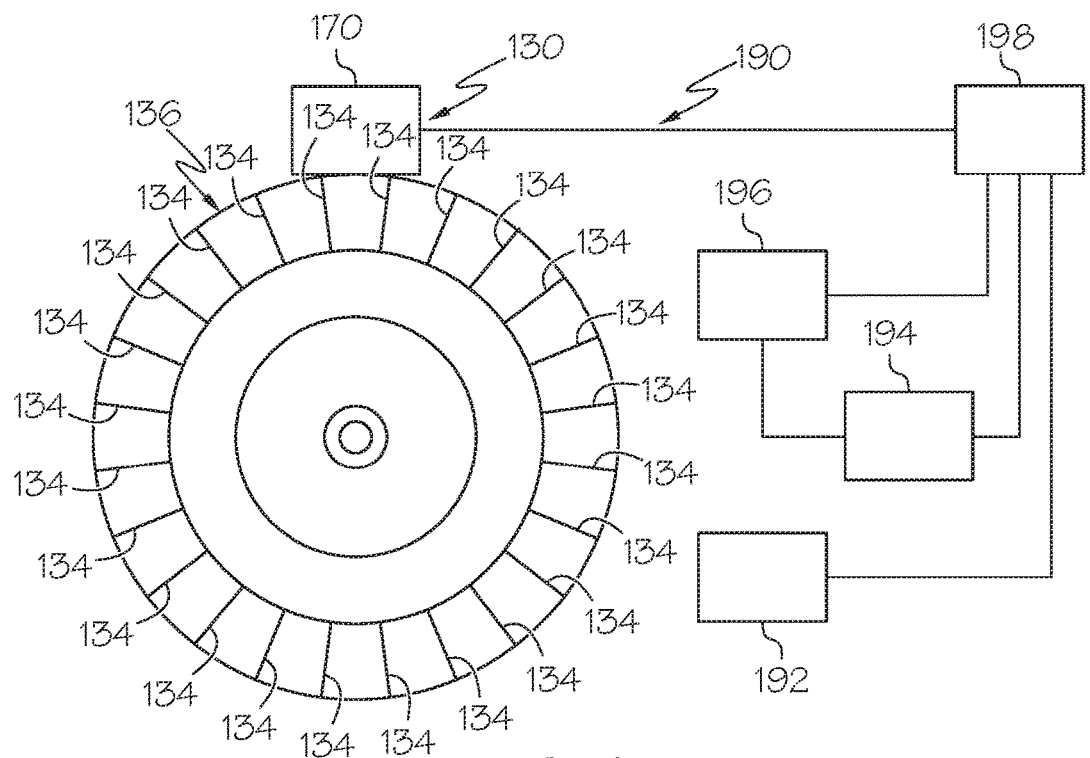
FIG. 6 is a schematic, transverse cross-sectional illustration of the turbine nozzle vane area of an engine in a first state, according to an exemplary embodiment.
Figure 7:
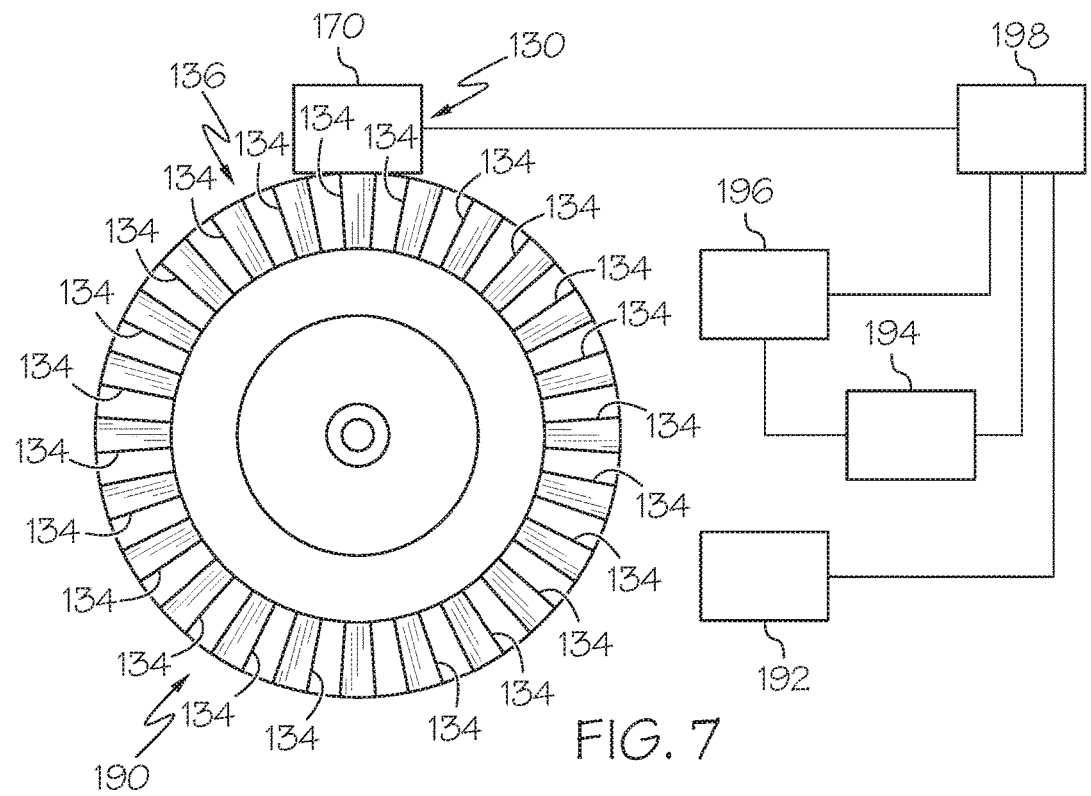
FIG. 7 is a schematic, transverse cross-sectional illustration of the turbine nozzle vane area of an engine in a second state, according to an exemplary embodiment.

As shown in FIG. 5, a VATN system 130 is applied to a first stage turbine rotor 112 of the engine 26 as an example. It should be understood that the VATN system 130 may be used with a single stage turbine, and in any number of stages in a multiple stage or spool turbine, such as with two stages as shown in FIG. 4. The VATN system 130 includes a number of vanes 134 disposed in the turbine nozzle 136 upstream from the turbine rotor 132 in this embodiment. Plural vanes 134 are illustrated in FIGS. 6-7, where it can be seen that the turbine nozzle 136 extends around the engine 126 and forms an annular flow passage for the combustion gas flow 138. Each vane 134 includes an airfoil 140 disposed in the turbine nozzle 136 that is shaped to permit unobstructed flow when open as shown in FIG. 6 and to increasingly restrict air flow when moved toward a closed position as shown in FIG. 7 where the vanes 134 are partially closed. Each airfoil 140 is supported at its inner end 142 by a shaft 144 that extends into the housing section 146 and is free to rotate therein. The endwall of the housing section 146 and ID section of vane 134 have a spherical shape to prevent leakage flow when the vane is rotated. In some embodiments, the vane 134 may be supported by a single pin such as with no pin at the hub (bottom as viewed). The airfoil 140 is supported at its outer end 148 by a round-shaped support 150 that is recessed into an opening 152 in the housing section 164 and is configured to rotate therein. A gas path seal 154 resides in a groove in the housing section 164 and contacts the support 150 at its outer perimeter 160 to seal the combustion gas 138 in the turbine nozzle 136. A stem 162 extends through and out of the housing section 164 with a stem seal 166 positioned between the stem 162 and the housing 164.

The VATN system 130 includes a drive system 170 configured to rotate the vanes 134 in unison to position them at various angles relative to the combusting gas flow 138. A stem gear 172 is disposed on the stem 162 outside the housing section 164. A spring 174 is disposed on the stem 162 and engages the stem gear 172. The spring 174, which may be grounded on the turbine case 44 (FIG. 2), maintains minimum ID flow path gap, including zero gap, to minimize leakage. In addition, each spring 174 provides damping to its respective vane assembly to minimize wear (such as stem and stem gear fretting). A ring gear 176 includes axial facing gear surface 178 and radially outward facing gear surface 180. The gear surface 178 meshes with the stem gear 172 and the gear surface 180 meshes with a drive gear 182. It should be understood that each of the plural vanes in the VATN system 130 includes a respective stem gear 172 meshing with the gear surface 178. The gears 172, 178, 180, 182 in the drive system 170 includes fine-toothed gears to accommodate a high rotation angle of approximately ninety-degrees between the open and closed states of FIGS. 6 and 7. The drive gear 182 is mounted on the shaft of an electric motor 184 which provides high torque to overcome the friction of the tight seals 154, 166 and a near-zero clearance low leakage design. In other embodiments, actuation of the drive gear 182 may be provided by hydraulic, pneumatic, mechanical, or other actuation means.

As shown in FIG. 6, the VATN system 130 may be integrated into a hybrid propulsion system 190. A generator 192, which in some embodiments may be the generator 80 of FIG. 3, is driven by the engine and charges a battery system 194. The battery system 194 may be used to drive one or more fan(s)/propeller(s) 196, which in some embodiments may be the fan 30 of FIG. 2. A controller 198 (FIG. 6) controls operation of the hybrid propulsion system 190 and the VATN system 130. In hybrid propulsion systems where flat rating of the engine power to altitude is desired, the power turbine VATN system is modulated open (FIG. 6) with altitude to increase the pressure ratio (PR) of the high pressure turbine (HPT). The rise in PR leads to an increase in speed of the high pressure spool as well as overall pressure ratio (OPR), which increases the core flow and the available margin to maximum turbine inlet temperature ($T_{4.1}$).

In an integrated, full-time APU application, the VATN is fully open (FIG. 6) on the ground to accommodate the increased core flow requirement at ground level running conditions and is modulated closed (FIG. 7) at altitude to match the significantly reduced core flow from the cabin return.

Figure 8:
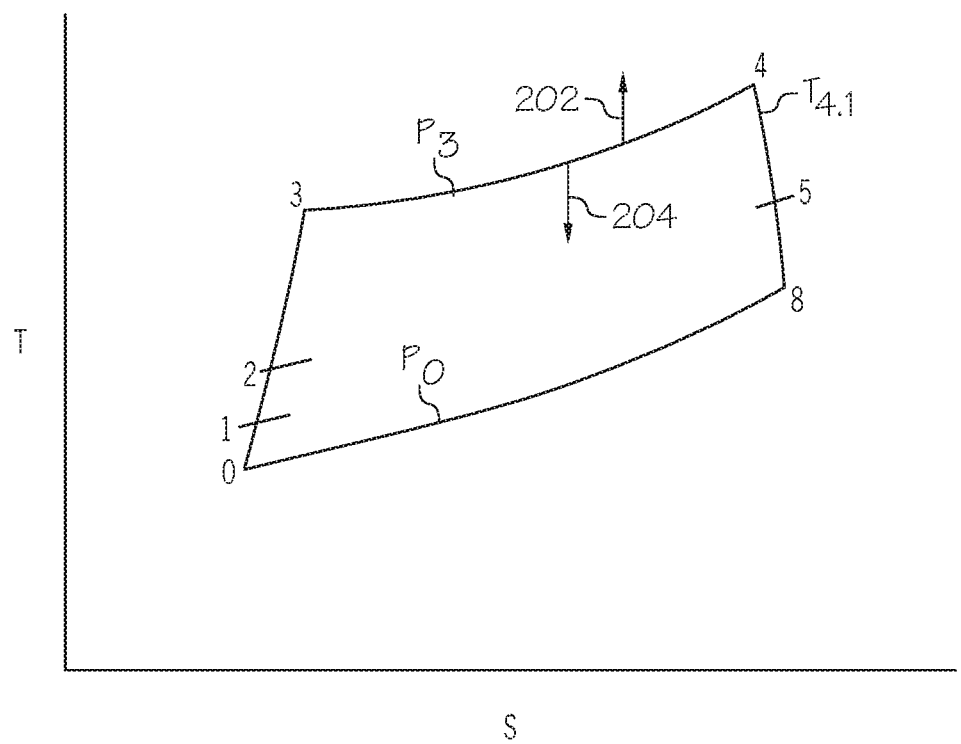
FIG. 8 is a representative diagram of temperature (T) versus entropy (S) for an engine, according to an exemplary embodiment.

The VATN system 130 extends PR and operational capabilities by moving the maximum operating pressure of the engine. For example, as shown in FIG. 8, a T-S (temperature-entropy) diagram of the gas turbine cycle is shown to represent aspects of the extended performance of the embodiments described herein. In the T-S diagram the engine stations are represented as 0 which designates free stream air conditions, 1 represents the engine inlet, 2-3 represent the compressor where temperature and pressure are increased, 3-4 represent the combustor where temperature is increased at constant pressure, 4-5 represent the turbine where temperature and pressure drop, and 5-8 represent post turbine stages including exhaust through exhaust nozzle. The combustor pressure $P_3$ and the external pressure $P_0$ define the PR of the engine. In a single spool engine with the VATN upstream of the turbine, varying the vanes 134 of the VATN system 130, changes the combustor pressure $P_3$ and therefore changes the PR $P_3/P_0$. For example, closing the vanes 134 increases $P_3$ (202) which increases the PR. Opening the vanes 134, decreases $P_3$ (204) which reduces PR. Accordingly, the engine 22, 24, 26 operates as a number of different engines that are matched to different operational needs as described herein. In addition, engine efficiency is increased by increasing the pressure ratio. Increasing $P_3$ also increases $T_{4.1}$ and so $T_{4.1}$ and exhaust gas temperatures may be reduced by modulating the vanes 134 open, which increases core flow.

As noted, in the embodiments described herein, the areas of the turbine nozzles 70, 72, 108, 110 as set by the VATN system 130 influence the total mass flow rate through the engine 22, 24, 26. Advanced turbine engines may be used in applications such as hybrid propulsion and integrated full-time APUs. The turbines for such applications may face increasing demands in terms of operational range. For example, hybrid propulsion engines (combined electric and gas turbine system) require extreme flat rating from sea level to high altitude, where engine power output is kept constant. It has been found that this is accomplished by providing a VATN engine that operates as different sized engines operated with power output reduced at ground level, then maintaining constant power in climb by increasing the high-pressure turbine $T_{4.1}$ to boost core flow, shaft-speed, and the OPR of the engine. This compensates for density drop with altitude to minimize core flow drop until $T_{4.1}$ reaches the engine's rated maximum condition. Once maximum $T_{4.1}$ is reached, the HPT power to drive the compressor reduces with higher altitude. With conventional fixed turbine nozzle geometry, the HPT PR stays relatively constant throughout its operating range. According to various embodiments, the VATN system 130 is modulated to increase an engine's OPR when the $T_{4.1}$ limit is reached allowing further increases of core flow to increase power.

Figure 9:
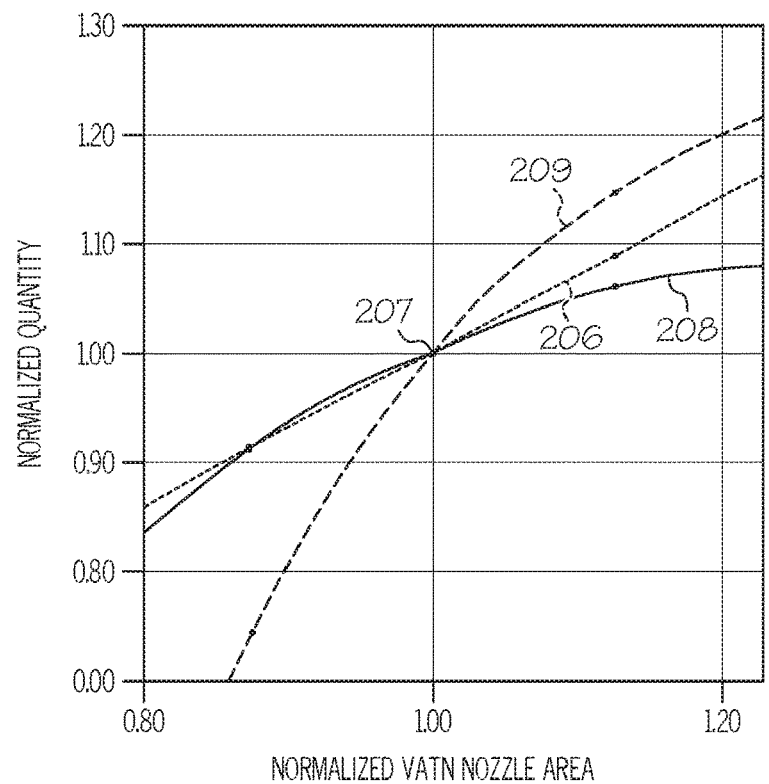
FIG. 9 is a plot of normalized quantities versus normalized nozzle area of a modulated VATN system operated at constant turbine inlet temperature, according to an exemplary embodiment.

By way of additional explanation, reference is directed to FIG. 9, where plots are shown of normalized quantities relative to a baseline at 1.00 versus normalized nozzle area of the modulated VATN system 130 relative to a baseline position at 1.00. For example, the VATN system 130 is positioned at a baseline position at 1.00 on the horizontal axis and produces quantities on the vertical axis of 1.00 at that baseline position. The baseline may be selected for typical operating conditions of the associated engine. The VATN system 130 is open more than the baseline position to the right of 1.00 and is closed more than the baseline position to the left of 1.00. FIG. 9 depicts turbine PR for a two-spool engine configuration with a HPT and a PT and with the VATN assembly located on the inlet nozzle to the PT. The PR of the HPT is represented by the curve 206 and the PR of the PT is represented by the curve 208. The curves 206 and 208 coincide at the baseline point 207 (e.g. where each produces its baseline quantity). Altitude is variable and is represented by the curve 209. The data represents engine operating conditions where the HP-turbine inlet temperature, the engine shaft power output and the PT speed are held constant When modulating the VATN at the PT open, there is a point where the flow increase by further opening the VATN is not significant enough to make up for the reduction in PR across the PT so that the net power output can no longer be either increased or maintained without increasing $T_{4.1}$. Increasing $T_{4.1}$ may be accomplished by modulating a VATN assembly on the HPT closed. Closing the VATN on the HPT, for example VATN assembly increases the PR on the HPT (and as a consequence the PR across the PT is reduced).

In embodiments for one spool engine applications with the VATN system 130 upstream of the single turbine, PR may also be influenced. For example, while running at a constant spool speed and constant turbine inlet temperature, increasing the turbine nozzle area by modulating open the VATN system 130, results in flow and power increases. Alternatively, opening the vanes 134 increases the flow while $T_{4.1}$ may be reduced to maintain the same output power. Lower T4.1 enables benefits such as extending time on wing.

Also for example, APUs may be fully integrated with the aircraft and provide energy for the environmental control system and electrical power both on the ground and while in flight. When operating in this manner, the design challenges of flow mis-match and turbine pressure ratio mis-match are overcome in the embodiments described herein. In addition, an approach to actively control the rise in exhaust gas temperature to extend the life of thermally exposed parts is provided, as is high altitude APU starting capability without increasing volume of the combustor, which avoids added weight.

Regarding flow mis-match in the full-time APU application (where the APU is fed only by cabin return flow from the ECS during the flight), for starting of the main engine (22, 24) with operating condition of the APU 74 being on the ground, the required flow by the APU to produce the power to start the engine (22, 24) may be larger than what it would normally receive when it is fed by the cabin return flow. The potential flow mismatch would otherwise require having an oversized engine 26 in the APU 74 to accommodate just the main engine start requirement. However, through use of the VATN system 130, the current embodiments enable adjusting the flow requirement of the engine 26 by modulating the vanes 134 to meet the changing operational requirements (open for main engine start and closing when in cabin pressurization mode).

Regarding turbine pressure ratio mismatch, maintaining desirable power at high altitudes where the air density is significantly lower than on the ground is challenging without using an oversized engine. One option would involve the re-use of pressurized air from the aircraft cabin 104 outflow to supercharge the engine compressor 82. While supercharging may keep the engine inlet pressure nearly constant through the flight envelope, the power turbine exhaust pressure decreases dramatically as the aircraft gains in altitude due to the lower pressure ambient conditions. Consequently, the power turbine operating PR increases by approximately a factor of two from operating the aircraft at sea level to operating the aircraft at an altitude of 41,000 feet. This may result in loss of turbine efficiency due to choked flow conditions in the power turbine. Through use of the VATN system 130 to operate an engine as if it were different sized engines to match operational requirements by varying the VATN to modulate the PR, the loss of turbine efficiency is avoided.

Through the embodiments described herein, the VATN system 130 extends turbine efficiency over a wider pressure ratio operating range by adjusting the work levels between stages. A higher pressure drop across a stage will result in more work being done in that stage. For example, with a HPT and a PT, a VATN system 130 applied to one stage may be modulated closed to increase the work done at the other stage. In other embodiments, with a VATN system 130 applied to both stages, the vanes 134 in the two stages may be modulated separately to vary the amount of work done by the two stages.

In a number of embodiments, the VATN system 130 enables extending the time-on-wing of the APU by compensating for an otherwise deterioration (reflected in increased fuel flow, increased $T_{4.1}$, and exhaust gas temperature (EGT)), by providing more engine core flow by modulating the VATN open. In some embodiments, the VATN system 130 may be paired with a compressor that has extended flow range. The compressor operation line may be reset to higher flow (i.e. towards choke) at a nearly constant PR as the VATN system 130 is modulated open. The higher core flow mitigates the rise in $T_{4.1}$/EGT at constant engine power output.

Figure 10:
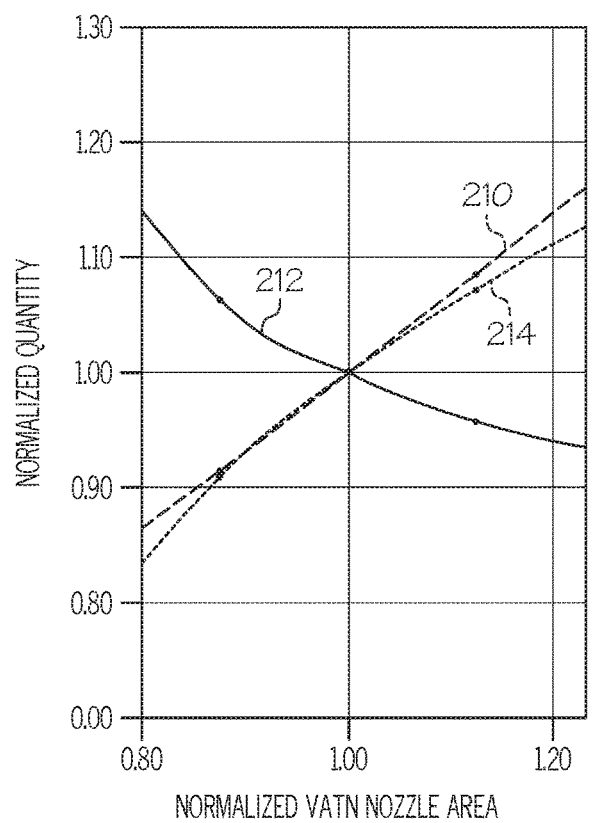
FIG. 10 is a plot of normalized quantities versus normalized nozzle area of a modulated VATN system operated at constant altitude, according to an exemplary embodiment.

Referring to FIG. 10, plots are shown of normalized quantities relative to a baseline at 1.00 versus normalized nozzle area of the modulated VATN system 130, relative to a baseline position. FIG. 10 depicts turbine PR for a two stage turbine with a HPT and a PT. The data represents constant altitude conditions with the VATN on the inlet nozzle to the PT, such as the VATN assembly 122 in the nozzle 110 arranged in a two-spool configuration. The PR of the HPT is represented by the curve 210 and the PR of the PT is represented by the curve 212. The core flow is represented by the curve 214. The curves 210 and 212 and 214 coincide at the baseline point 214 (e.g. each produces its baseline quantity). As the VATN system 130 is opened, such as by moving the vanes 134 in an opening direction, PR of the PT is decreased as demonstrated by the curve 212, while PR of the HPT is increased as demonstrated by curve 210. Core flow and HPT speed will also increase due to the increased PR. While keeping the engine output power constant, the increase in core flow allows for a reduction in T41, therefore extending the time on wing.

In embodiments with multiple spool engines, the PT has been found to have excess PR with altitude as the exhaust back-pressure drops. Accordingly, the VATN system 130 provides a means of adjusting the PRs as described above between the HPT and PT, to increase HPT PR. This has been found to result in the ability to extend the altitude capability of the engine, or provide the same power at reduced $T_{4.1}$ at the same altitude. Take, for example, an embodiment where the VATN system 130 is located in the HPT inlet nozzle, such as the VATN assembly 120 in a nozzle of an engine arranged in a two spool configuration. In this example when the VATN is located upstream of the HP turbine, maintaining constant output power and closing the VATN system 130 such as by moving the vanes 134 in a closing direction enables increasing altitude while maintaining the same HP turbine inlet temperature.

The VATN system 130 enhances starting capability, especially high altitude re-starts by reducing the combustor loading parameter Phi. Phi is proportional to the mass flow through the combustor and inversely proportional to the product of the combustor volume and the pressure in the combustor to the power of 1.75. With the VATN system 130 fully closed (beyond the state of FIG. 7), the air flow during the initial spool-up builds pressure in the combustor chamber while the air mass flow rate in the combustor is at near-zero levels, with the effect of reducing the loading parameter Phi to conditions that are ideal for starting. Moreover, the VATN system 130 enables reducing combustor volume to minimize weight and the installation envelope.

In applications where extended time on wing is desirable, the VATN is modulated in general, to increase the flow through the engine and to lower the HP turbine inlet temperature $T_{4.1}$ while maintaining the power output (such as to drive a generator, propeller, etc.). In hybrid propulsion applications, to increase the altitude at which the engine operates, the VATN is modulated, in general, to increase flow through the engine while maintaining the HP turbine inlet temperature $T_{4.1}$, leading to an increase in power output. This excess in power can be used to increase the altitude at which the engine operates.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine configured to operate at an overall pressure ratio, the gas turbine engine comprising:
a compressor configured to supply compressed air;
a combustor configured to receive at least a portion of the compressed air and a flow of fuel, and to generate a flow of combusted gas;
a turbine coupled to receive a core flow of the combusted gas from the combustor to rotate a turbine rotor, the turbine configured to operate at a turbine pressure ratio that is variable, wherein the turbine rotor comprises a high pressure rotor configured to operate at a first pressure ratio and comprising a power rotor disposed downstream from the high pressure rotor, wherein the core flow influences power output of the gas turbine engine, the turbine rotor configured to operate at a range of temperatures, the power rotor configured to operate at a second pressure ratio;
a turbine inlet nozzle disposed between the combustor and the turbine rotor, and configured to direct the combusted gas to the turbine rotor;
a first number of vanes disposed in the turbine inlet nozzle, the vanes configured to vary a flow area through which the core flow passes to change the turbine pressure ratio of the turbine;
a second number of vanes disposed between the high pressure rotor and the power rotor;
at least one actuator configured to rotate the first and second number of vanes; and
a controller configured to:
accommodate, by positioning at least one of the first number of vanes and the second number of vanes via the at least one actuator to an open position, an increased core flow requirement of the core flow of the gas turbine engine;
vary, by positioning the second number of vanes, the first pressure ratio and a speed of the high pressure rotor, and to modify a margin to a preferred maximum of the range of temperatures; and
match, by modulating at least one of the first number of vanes and the second number of vanes via the at least one actuator, a reduced requirement of the core flow through the gas turbine engine to control engine power,
wherein at least one of the first number of vanes and the second number of vanes are configured to adjust the turbine pressure ratio of the turbine providing states of the turbine to compensate for changing operational requirements of the gas turbine engine by rotating to positions of at least one of the first number of vanes and the second number of vanes matching the changing operational requirements, where changing the states defines both the overall pressure ratio and the core flow, extending operational capability of the gas turbine engine.

2. The gas turbine engine of claim 1, wherein the turbine rotor includes a first spool with the high pressure rotor operating at the first pressure ratio and a second spool with the power rotor operating at the second pressure ratio, wherein the controller, by operating at least one of the first number of vanes and the second number of vanes via the at least one actuator, is configured to rebalance the first and second pressure ratios across the high pressure rotor and the power rotor, wherein rebalance means reducing one of the first and second pressure ratios while increasing another of the first and second pressure ratios.

3. The gas turbine engine of claim 1, comprising a pressurized source configured to deliver a secondary flow of air to the gas turbine engine, wherein the secondary flow of air exhibits a varying flow rate; wherein the gas turbine engine is operated at varying altitude; wherein at least one of the first number of vanes and the second number of vanes are configured to fully open at ground level to accommodate an increased requirement of the core flow and the vanes are modulated closed as altitude increases to match a reduction in the flow of air from the pressurized source.

4. The gas turbine engine of claim 3, comprising a fan disposed in the engine, the fan configured to modify the core flow, wherein the controller is configured to drive, via an electric supply, the fan in a hybrid operation of the gas turbine engine, wherein the controller is configured to operate the fan and, via the at least one actuator, at least one of the first number of vanes and the second number of vanes to control power output of the gas turbine engine.

5. The gas turbine engine of claim 4, comprising a battery for driving the fan, wherein the controller is configured to control the hybrid operation in coordination with the at least one actuator.

6. The gas turbine engine of claim 1, comprising:
a stem connected with each of the first number of vanes;
a stem gear on each stem;
a ring gear meshing with each stem gear and extending around the turbine;
a drive gear meshing with the ring gear; and
the at least one actuator is configured to rotate the drive gear.

7. The gas turbine engine of claim 6, comprising:
a housing section defining an opening; and
a support connected between each stem and the first number of vanes, wherein the support is configured to rotate in the opening.

8. The gas turbine engine of claim 1, wherein the controller is configured to increase, by closing at least one of the first number of vanes and the second number of vanes, a pressure in the combustor, and decrease, by opening at least one of the first number of vanes and the second number of vanes, the pressure in the combustor, extending the operational capability by moving a maximum operating pressure of the gas turbine engine.

9. The gas engine of claim 1, wherein at least one of the first number of vanes and the second number of vanes, are configured to reduce a loading parameter of the combustor by modulating to a fully closed position for starting the gas turbine engine at altitude.

10. The gas turbine engine of claim 1, wherein the controller is configured to:
modify, by operation of the compressor, a compressor flow; and
maintain, by operation of at least one of the first number of vanes and the second number of vanes, an exhaust gas temperature below a prescribed limit.

11. A method of operating a gas turbine engine that operates at an overall pressure ratio, the gas turbine engine including a compressor, a combustor and a turbine configured to operate at a turbine pressure ratio that is variable, the turbine supplied with combustion gas from the combustor through a turbine inlet nozzle, wherein the turbine rotor comprises a high pressure rotor configured to operate at a first pressure ratio and comprising a power rotor disposed downstream from the high pressure rotor, the turbine rotor configured to operate at a range temperatures, the power rotor configured to operate at a second pressure ratio, the method comprising:
  positioning a first number of vanes in the turbine inlet nozzle;
  positioning a second number of vanes between the high pressure rotor and the power rotor;
  configuring the vanes with the first number of vanes and the second number of vanes with at least one actuator to change the pressure ratio of the turbine;
  operating the gas turbine engine with a core flow where the core flow influences power output of the gas turbine engine
  rotating, by a controller operating the at least one actuator, at least one of the first number of vanes and the second number of vanes to vary a flow area through which the core flow passes;
  accommodating, by positioning at least one of the first number of vanes and the second number of vanes via the controller operating the at least one actuator to an open position, an increased core flow requirement of the core flow of the gas turbine engine;
  matching, by modulating at least one of the first number of vanes and the second number of vanes via the controller operating the at least one actuator, a reduced requirement of the core flow through the gas turbine engine, controlling engine power;
  varying, by positioning the second number of vanes, the first pressure ratio and a speed of the high pressure rotor, and to modify a margin to a preferred maximum of the range of temperatures; and
  adjusting a turbine pressure ratio of the turbine providing states of the turbine to compensate for changing operational requirements of the gas turbine engine by rotating at least one of the first number of vanes and the second number of vanes to positions matching the changing operational requirements, and changing the states defines both the overall pressure ratio and the core flow, extending operational capability of the gas turbine engine.

12. The method of claim 11, comprising:
  operating the gas turbine engine at varying altitudes;
  maintaining a flat rating of the gas turbine engine power while the altitude changes by increasingly opening at least one of the first number of vanes and the second number of vanes as the altitude increases; and
  keeping the core flow constant while pressure ratio of the turbine increases with increasing altitude to maintain the flat rating.

13. The method of claim 11, comprising:
  operating the gas turbine engine at varying altitude;
  receiving a secondary flow of air in the gas turbine engine from a pressurized source;
  fully opening at least one of the first number of vanes and the second number of vanes at ground level to accommodate an increased requirement of the core flow; and
  modulating at least one of the first number of vanes and the second number of vanes closed as altitude increases to match a reduction in the flow of air from the pressurized source.

14. The method of claim 13, comprising:
  operating the gas turbine engine as an auxiliary power unit; and
  delivering the pressurized source as an aircraft cabin air return.

15. The method of claim 11, comprising:
  positioning the power rotor in the turbine to receive the core flow; and
  changing a pressure drop through at least one of the turbine rotors by rotating at least one of the first number of vanes and the second number of vanes to adjust a work level between two turbine rotors, extending an operating pressure range of the turbine.

16. The method of claim 11, comprising:
  connecting a stem with each of the first number of vanes and the second number of vanes;
  connecting a stem gear on each stem;
  meshing a ring gear with each stem gear;
  extending the ring gear around the turbine;
  meshing a drive gear with the ring gear; and
  rotating the drive gear by the at least one actuator.

17. The method of claim 11, comprising increasing pressure ratio of the gas turbine engine by modulating at least one of the first number of vanes and the second number of vanes closed to increase power output of the turbine.

18. The method of claim 11, comprising:
  modulating at least one of the first number of vanes and the second number of vanes to a fully closed position to reduce the loading parameter of the combustor; and to facilitate starting the gas turbine engine at altitude.

19. The method of claim 11, comprising increasing the core flow by modulating at least one of the first number of vanes and the second number of vanes open to reduce turbine inlet temperature.

20. A gas turbine engine configured to operate at an overall pressure ratio, the gas turbine engine comprising:
  a compressor having an air inlet and a compressed air outlet, and operable to increase temperature and pressure and to supply compressed air;
  a combustor configured to receive at least a portion of the compressed air and a flow of fuel, and to generate a flow of combusted gas at a constant pressure;
  a turbine coupled to receive a core flow of the combusted gas from the combustor to rotate a turbine rotor, wherein the turbine rotor comprises a high pressure rotor configured to operate at a first pressure ratio and comprising a power rotor disposed downstream from the high pressure rotor, wherein the core flow is axially directed, the turbine configured to operate at a turbine pressure ratio that is variable, wherein the core flow influences power output of the gas turbine engine, the turbine rotor configured to operate at a range of temperatures, the power rotor configured to operate at a second pressure ratio;
  a turbine inlet nozzle disposed between the combustor and the turbine rotor, and configured to direct the combusted gas to the turbine rotor;
  a first number of vanes disposed in the turbine inlet nozzle and a second number of vanes disposed between the high pressure rotor and the power rotor, the first and second number of vanes configured with at least one actuator to rotate the first and second number of vanes to vary a flow area through which the core flow passes; and
  a controller configured to:
    accommodate, by positioning at least one of the first number of vanes and the second number of vanes via the at least one actuator to an open position, an increased core flow requirement of the core flow of the gas turbine engine;
    vary, by positioning at least one of the first number of vanes and the second number of vanes, the turbine pressure ratio and a speed of the at least one turbine rotor, and to modify a margin to a preferred maximum of the range of temperatures; and match, by modulating at least one of the first number of vanes and the second number of vanes via the at least one actuator, a reduced core flow through the gas turbine engine, to control engine power, wherein the at least one of the first number of vanes and the second number of vanes are configured to adjust the turbine pressure ratio of the turbine providing states of the turbine to compensate for changing operational requirements of the gas turbine engine by rotating to positions of the first number of vanes and the second number of vanes matching the changing operational requirements, where changing the states defines both the overall pressure ratio and the core flow, extending operational capability of the gas turbine engine.

\* \* \* \* \*

UNITED STATES PATENT AND TRADEMARK OFFICE
CERTIFICATE OF CORRECTION

| | |
|---|---|
| PATENT NO. | : 11,480,111 B2 |
| APPLICATION NO. | : 16/412771 |
| DATED | : October 25, 2022 |
| INVENTOR(S) | : David K. Jan, Dietmar Giebert and Thomas G. Cunningham, Jr. |

It is certified that error appears in the above-identified patent and that said Letters Patent is hereby corrected as shown below:

In the Claims

Column 13, Line 8 (Claim 11) - delete "the vanes with"

Signed and Sealed this
Twenty-third Day of May, 2023

Katherine Kelly Vidal
Director of the United States Patent and Trademark Office